(12) United States Patent
Finlayson et al.

(10) Patent No.: US 11,622,085 B2
(45) Date of Patent: Apr. 4, 2023

(54) MULTISPECTRAL IMAGE DECORRELATION METHOD AND SYSTEM

(71) Applicant: Apple Inc., Cupertino, CA (US)

(72) Inventors: Graham Finlayson, Norwich (GB); Alex Hayes, Cambridge (GB)

(73) Assignee: Apple Inc., Cupertino, CA (US)

( * ) Notice: Subject to any disclaimer, the term of this patent is extended or adjusted under 35 U.S.C. 154(b) by 426 days.

(21) Appl. No.: 16/825,633

(22) Filed: Mar. 20, 2020

(65) Prior Publication Data

US 2020/0304732 A1 Sep. 24, 2020

(30) Foreign Application Priority Data

Mar. 20, 2019 (GB) ...................................... 1903816

(51) Int. Cl.
*H04N 5/33* (2006.01)
*G01J 3/28* (2006.01)
*H04N 5/341* (2011.01)
*H04N 9/04* (2006.01)
*G06T 3/40* (2006.01)

(52) U.S. Cl.
CPC ............ *H04N 5/332* (2013.01); *G01J 3/2823* (2013.01); *G06T 3/4015* (2013.01); *H04N 5/3415* (2013.01); *H04N 9/04553* (2018.08); *G01J 2003/2826* (2013.01)

(58) Field of Classification Search
CPC . H04N 5/2353; H04N 5/2352; H04N 5/37455
USPC ...................................................... 348/229.1
See application file for complete search history.

(56) References Cited

U.S. PATENT DOCUMENTS

| 2015/0062347 | A1* | 3/2015 | Jin | .......................... | H04N 5/332 |
| | | | | | 348/164 |
| 2018/0091790 | A1* | 3/2018 | Park | .................. | H01L 27/14645 |
| 2019/0006406 | A1* | 1/2019 | Ozawa | ................ | H01L 27/1462 |

OTHER PUBLICATIONS

Finlayson et al., "Pop image fusion-derivative domain image fusion without reintegration," Proceedings of the IEEE International Conference on Computer Vision (2015).

(Continued)

*Primary Examiner* — Lin Ye
*Assistant Examiner* — Chan T Nguyen
(74) *Attorney, Agent, or Firm* — Blank Rome LLP

(57) ABSTRACT

A method of creating a multispectral decorrelation model for use in determining a visible image from a multispectral image captured using a multispectral image sensor, the method comprising the steps of: generating, using a plurality of quantum efficiency curves for the multispectral image sensor and a plurality of synthetic light spectrum vectors, a grid of synthetic multispectral pixel values and a corresponding grid of synthetic visible pixel values, wherein each synthetic visible pixel value is substantially decorrelated from a non-visible component of a corresponding synthetic multispectral pixel value; and determining a multispectral decorrelation model using the grid of synthetic multispectral pixel values and the corresponding grid of synthetic visible pixel values, wherein the multispectral decorrelation model in use maps a multispectral pixel value of the multispectral image to a visible pixel value of the visible image.

20 Claims, 9 Drawing Sheets

(56) References Cited

OTHER PUBLICATIONS

Garcia, Eric K., and Maya R. Gupta, "Lattice Regression," Advances in Neural Information Processing Systems (NIPS), 2009.
Poljicak, et al., "An optimized Radial Basis Function model for color characterization of a mobile device display," Displays 41 (2016).

* cited by examiner

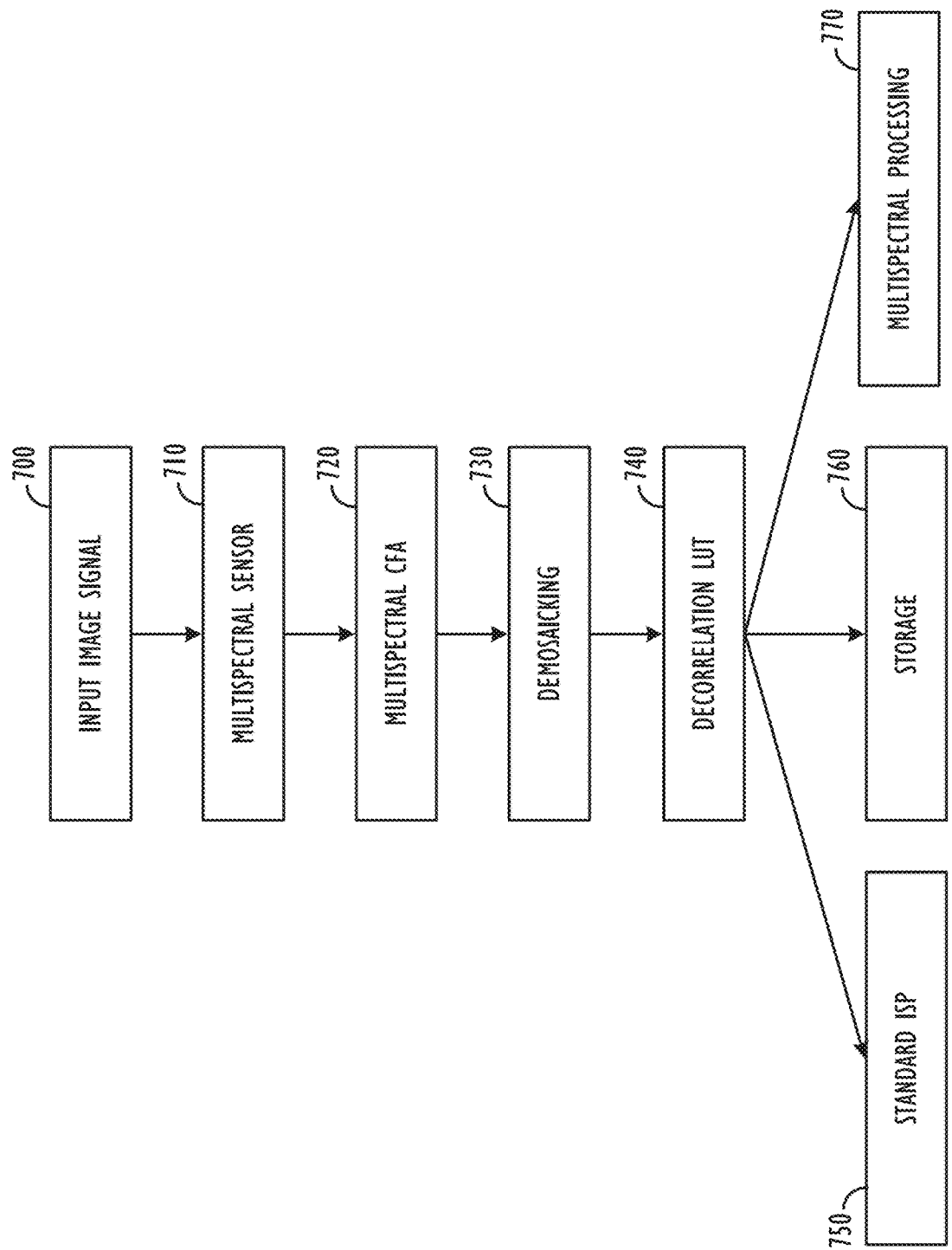

MULTISPECTRAL IMAGE DECORRELATION METHOD AND SYSTEM

TECHNICAL FIELD

The present disclosure relates to a method and system for decorrelating combined multispectral image information captured on a single imaging sensor, where some or all of the pixels are sensitive to multiple parts of the electromagnetic spectrum.

BACKGROUND

Traditional (i.e., visible spectrum only) imaging sensors use an optical filter to block light wavelengths outside the visible spectrum, then use a colour filter array (CFA) of red, green, and blue pixels arranged in a Bayer pattern (e.g., as illustrated in FIG. 1a) to split the visible spectrum into colours appropriate for human perception (e.g., RGB is analogous to the Long Medium Short (LMS) cones in the human eye). These three visible colours of red, green, and blue are only moderately correlated, and the remaining unwanted correlation are typically removed to a satisfactory degree using a 3×3 colour correction matrix (CCM).

Some prior colour correction methods assume certain properties about the input signal, such as a generally low to moderate degree of intensity correlation between the input image channels, because they are designed for mapping captured RGB to XYZ or sRGB colour spaces. More generally, metamerism (multiple input image signals mapping to the same output signal) can be assumed to be present on a predictable vector in the input image space. But due to the high levels of correlation between visible and multispectral image signals, metamerism is a much more significant and underdetermined problem for multispectral imaging systems. Known previous methods do not solve this problem to a satisfactory degree.

Multispectral imaging sensors capture information in one or more bands outside the visible spectrum (e.g. near-infrared (NIR) or ultraviolet (UV)), as well as RGB visible spectrum image information. This is accomplished by removing the infrared (IR) blocking optical filter, and using a different CFA pattern, e.g., which includes pixels other than red, green and blue.

Multispectral sensors for scientific applications use band-pass micro-filters covering different parts of the spectrum, giving clean decorrelated wavelength bands, but multispectral sensors for commercial applications typically use a combination of standard RGB visible colour filters and either multispectral filters or no filter. FIG. 1b and FIG. 1c show examples of 2×2 and 4×4 patterns with RGB and infrared (IR) pixels (known as RGB-IR sensors), respectively, and FIG. 1d shows an example of a 2×2 pattern with RGB and clear pixels (known as RGBC or RGBW sensors—where the 'C' and 'W' stand for 'Clear' and 'White,' respectively).

The properties of RGB colour filters mean that they all transmit light outside the visible spectrum (i.e. wavelengths longer than 700 nm). FIG. 2 shows an approximation of the quantum efficiency (QE) curves of an RGB-IR sensor, and FIG. 3 shows an approximation of the QE curves of an RGBW sensor.

In both cases illustrated in FIGS. 2 and 3, the RGB pixels are also sensitive to wavelengths outside the visible spectrum, e.g., for the RGB-IR sensor, the RGB pixels are in reality closer to R+IR, G+IR and B+IR, while the IR pixels also have some sensitivity in the visible spectrum. The problem of discovering the true visible RGB image signal (or other desired image signal) from this combined visible+multispectral signal is herein defined as "multispectral decorrelation." This terminology is used because, in the case of RGB-IR imaging, e.g., the captured RGB signal (which is typically in practice a combined RGB and IR signal) and the captured IR signal (which is typically in practice an IR signal combined with a small amount of RGB signal) are highly correlated. Therefore, this signal separation problem is referred to herein as "decorrelation."

Looking again at FIG. 2, the amount of correlation between the R and IR QE curves in the 700-800 nm range (also termed "cross-talk") is so high that RGB-IR decorrelation becomes an under-determined problem with multiple possible RGB outputs for a single RGB-IR input. To make the decorrelation problem mathematically solvable, RGB-IR imaging systems often use a dual band-pass filter (also termed a "notch" filter) in front of the imaging sensor. This transmits wavelengths in the visible spectrum from 400-650 nm, and in the near-infrared spectrum, centred either around 850 nm or 940 nm (FIG. 4 shows an example transmittance curve for an 850 nm dual band-pass filter).

Existing RGB-IR imaging systems assume that the use of a notch filter reduces RGB-IR correlation to a low enough level for a 4×3 CCM to be sufficient to decorrelate the signals. This CCM may be constant, or it may be changed, depending on the estimated illumination conditions. An example of this type of scenario is also shown in US Patent Publication No. 2015/0062347. However, these methods do not provide sufficiently accurate colour reproduction.

Some situations in which previous methods particularly struggle to satisfactorily decorrelate the RGB-IR signals include: 1.) Highly IR reflective materials (e.g., with spectral reflectance curves such as those shown in FIG. 5a); 2.) Active IR illumination (e.g., IR light emitting diodes (LEDs)); and 3.) Tungsten lamps (owing to their high levels of IR intensity, such as shown in FIG. 5b).

SUMMARY

Embodiments of the present disclosure use estimated or measured QE curves of multispectral sensors and dual band-pass filters, together with large data sets of synthetic reflected light spectra (calculated to provide an even multispectral sampling), to predict the multispectral imaging system pixel responses, and the corresponding responses of a hypothetical visible spectrum RGB imaging system.

Embodiments of the present disclosure seek to address the multispectral decorrelation problem identified above. Embodiments of the present disclosure seek to provide systems and methods that provide colour correction for multi-spectral imaging systems. Embodiments of the present disclosure seek to provide systems and methods that take into account metamerism and provide improved colour correction in multi-spectral imaging systems comparison to known colour correction systems.

In preferred embodiments, due to statistically even sampling of the input image space, together with decorrelation model calculation, the most likely output for a given input multispectral image signal is determined. This solves the aforementioned problems to a degree acceptable for consumer imaging applications.

The examples set out below focus on recovering the RGB pixel values from the combined RGB+multispectral pixels (as previously defined), because colour quality is defined and measured in visible RGB coordinates, and it is the most useful for human perception. However, other output formats could be generated by the recovery process, such as CIE 1931 XYZ or CIELAB colour space values, simulated wide-band "clear" greyscale values, or visible spectrum greyscale luma information.

Preferred embodiments of the present disclosure use Gaussian process regression, or other mathematical regression methods, to create a model which decorrelates the visible spectrum RGB outputs for an N-dimensional grid of input multispectral pixels. Embodiments of the present disclosure use this model to create a multispectral decorrelation lookup table (LUT), or create a LUT using lattice regression from simulated input and output samples.

Embodiments of the present disclosure store this grid of LUT outputs, and use them as part of a real-time multispectral imaging system. Captured multispectral pixel responses may be linearly interpolated in N dimensions between the LUT grid points to produce decorrelated RGB output pixel responses.

Alternative embodiments may use a different model, whether parametric or based on artificial intelligence (AI) to create the LUT, or may use the model directly without a LUT.

In some applications, exposure invariance may be important, in which case the LUT should be implemented to preserve hue and saturation.

Using the methods described below, embodiments enable multispectral imaging systems to produce accurate visible RGB pixel responses in a wide range of illumination conditions and scene types.

EXAMPLES

The following examples pertain to further embodiments:

Example 1 is a method of creating a multispectral decorrelation model for use in determining a visible image from a multispectral image captured using a multispectral image sensor, the method comprising the steps of: generating, using a plurality of quantum efficiency curves for the multispectral image sensor and a plurality of synthetic light spectrum vectors, a grid of synthetic multispectral pixel values and a corresponding grid of synthetic visible pixel values, wherein each synthetic visible pixel value is substantially decorrelated from a non-visible component of a corresponding synthetic multispectral pixel value; and determining a multispectral decorrelation model using the grid of synthetic multispectral pixel values and the corresponding grid of synthetic visible pixel values, wherein the multispectral decorrelation model in use maps a multispectral pixel value of the multispectral image to a visible pixel value of the visible image.

Example 2 comprises the method of example 1 wherein the plurality of synthetic light spectrum vectors evenly sample multispectral image space when point wise multiplied by the plurality of quantum efficiency curves.

Example 3 comprises the method of example 1 wherein the multispectral decorrelation model consists of a trainable model such that a trained multispectral decorrelation model estimates a transformation from multispectral image space to visible image space.

Example 4 comprises the method of example 3 wherein the multispectral decorrelation model is one of: a Gaussian process regression model; a lattice regression model; a neural network; a genetic algorithm.

Example 5 comprises the method of example 3 wherein the multispectral decorrelation model is exposure invariant.

Example 6 comprises the method example 3 further comprising the steps of: determining a plurality of input multispectral pixel values by evenly sampling multispectral image space; and providing the plurality of input multispectral pixel values to the trained multispectral decorrelation model thereby to populate a decorrelation look up table.

Example 7 comprises the method of example 6 further comprising the step of: saving the decorrelation look up table to a computer readable medium.

Example 8 comprises the method of example 1 wherein the grid of synthetic multispectral pixel values is generated by point-wise multiplying the plurality of quantum efficiency curves by the plurality of synthetic light spectrum vectors.

Example 9 comprises the method of example 1 wherein the grid of corresponding synthetic visible pixel values is generated by one of: point-wise multiplying the plurality of quantum efficiency curves by the plurality of synthetic light spectrum vectors in the range of 400 700 nm; and point-wise multiplying a plurality of visible light specific quantum efficiency curves by the plurality of synthetic light spectrum vectors.

Example 10 comprises the method of example 1 wherein a synthetic light spectrum vector of the plurality of synthetic light spectrum vectors represents a spectrum of light incident on the multispectral image sensor.

Example 11 comprises the method of example 1 further comprising the step of: optimizing, using a numerical optimization algorithm, a loss function thereby to generate a synthetic light spectrum vector of the plurality of synthetic light spectrum vectors.

Example 12 comprises the method of example 11 wherein the loss function calculates a difference between a candidate synthetic light spectrum vector multiplied by the plurality of quantum efficiency curves and a target multispectral pixel value.

Example 13 comprises the method of example 11 wherein the numerical optimization algorithm is one of: a conjugate gradient method; and a quadratic programming algorithm.

Example 14 comprises the method of example 1 further comprising the step of: multiplying a transmission spectrum of an optical filter to each quantum efficiency curve of the plurality of quantum efficiency curves prior to the step of generating.

Example 15 comprises the method of example 14 wherein the optical filter is a dual band pass filter comprising an infrared transmission centred at 850 nm or 940 nm.

Example 16 comprises the method of example 1 wherein a multispectral pixel value of the multispectral image comprises a red pixel value, a blue pixel value, a green pixel value, and an infrared pixel value.

Example 17 comprises the method of example 1 wherein a multispectral pixel value of the multispectral image comprises a red pixel value, a blue pixel value, a green pixel value, and a white pixel value.

Example 18 is an apparatus comprising: one or more processors; and a computer-readable medium including one or more sequences of instructions that, when executed by the one or more processors, cause the apparatus to execute the method of example 1.

Example 19 comprises the apparatus of example 18, wherein the sequences of instructions further cause the apparatus to execute the method of example 2.

Example 20 is a non-transitory computer-readable medium having stored thereon sequences of instructions to cause one or more processors to carry out the method of example 1.

BRIEF DESCRIPTION OF THE DRAWINGS

Embodiments of the present disclosure will now be described, by way of example only, with reference to the accompanying drawings, in which:

FIG. 7 shows a flow diagram of how the multispectral decorrelation method fits into a multispectral imaging system, including different output directions for the output RGB image, i.e.: to a standard image signal processor, to storage, or to specialised multispectral processing.

FIG. 9b shows the ground truth visible RGB image version of FIG. 9a.

DETAILED DESCRIPTION

Turning now to FIG. 7, a flow diagram illustrating how the multispectral image signal decorrelation method fits into a multispectral imaging system is shown, according to one or more embodiments.

In step 700, an input image signal is obtained. In step 710, a multispectral sensor captures a RAW image of interleaved RGB and multispectral pixel intensities, e.g., via the use of a multispectral CFA (step 720).

In step 730, a demosaicking algorithm may be used to convert this RAW sampled image into N full resolution image channels (e.g., RGB+multispectral). Defective pixel correction and/or noise reduction may also be performed at this stage.

In step 740, the N channels (e.g., RGB+multispectral) may be used as inputs to the N-dimensional decorrelation LUT. This produces an output image from the LUT, in which the visible RGB image has been decorrelated from the IR image. This process is described in more detail, below.

The decorrelated LUT output RGB image may be passed into a standard image signal processor (ISP) (step 750), written to storage (step 760), and/or have other processing applied to it (step 770).

According to at least some of the embodiments discussed below, and in contrast to prior techniques that use either a fixed N×3 CCM or that select a N×3 CCM based on illumination conditions to decorrelate multispectral image signals, the proposed embodiments use a single N-D LUT for all illumination conditions to decorrelate multispectral image signals with higher levels of colour accuracy, fewer artefacts, and lower levels of noise in the output RGB image.

This N-D LUT may have any number of nodes in each dimension, wherein this number can be chosen to, e.g., minimize memory (i.e., using fewer nodes) or maximise decorrelation accuracy (i.e., using more nodes). The spacing of the nodes within the range of possible input values may be either uniform or nonuniform, depending on the requirements and capabilities of the system.

Example of Decorrelation LUT Performance

Figure 8B:
FIGS. 8a and 8b show examples of the luma channel of an input correlated RGB image to the decorrelation method from an RGB-IR imaging system and the IR channel, respectively.
Figure 8A:
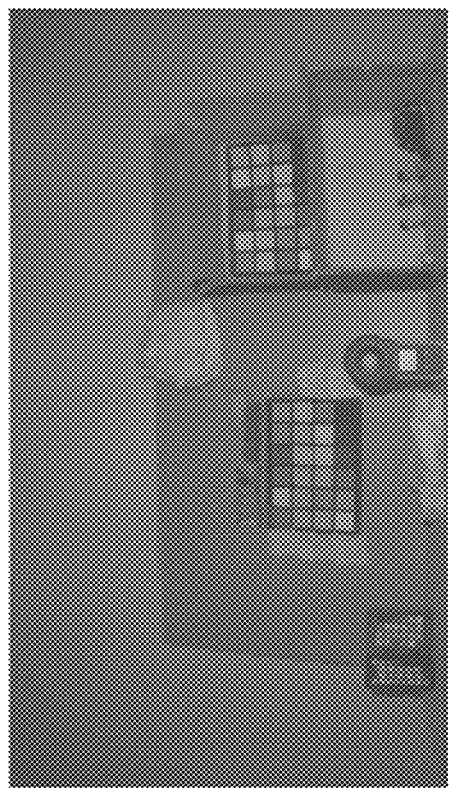
Figure 9A:
FIG. 9a shows the luma channel of the output RGB image from the decorrelation method using the images in FIGS. 8a and 8b as inputs.
Figure 9B:

In the example in FIGS. 8a-b and 9a-b, input demosaicked full-resolution correlated RGB (FIG. 8a) and IR (FIG. 8b) images are provided as input to an embodiment of the decorrelation LUT calculated for this particular RGB-IR imaging system. The intensity of IR light in this scene is high, so the correlated RGB and IR images look visually similar. The decorrelated RGB output is shown in FIG. 9a, and, for comparison, a ground truth visible spectrum RGB image is shown in FIG. 9b. (FIG. 9b was generated by putting an optical filter in front of the sensor to block all IR light.) The decorrelated RGB output looks visually similar to the ground truth RGB image. In particular, the relative intensities of the Macbeth colour checker patches match between them, unlike in the input correlated RGB image. The IR image details in the dark box are also removed. In a real RGB-IR imaging system, these may be re-added in a later processing stage using an image fusion method (e.g. the method of Finlayson et al., Finlayson, Graham D., and Alex E. Hayes. "Pop image fusion-derivative domain image fusion without reintegration." *Proceedings of the IEEE International Conference on Computer Vision.* 2015, the content of which is hereby incorporated by reference). The most visible difference between the decorrelated RGB image and the ground truth RGB image is higher levels of noise in the decorrelated RGB image, which is a by-product of some decorrelation methods, as there is nearly always some trade-off between decorrelation accuracy and levels of noise.

LUT Input/Output Sample Generation

Figure 1A:
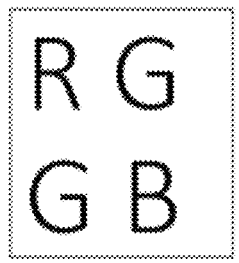
FIG. 1a shows a 2×2 repeating pattern of pixels (i.e., a Bayer pattern) found on the CFA of an RGB imaging sensor.
Figure 1B:
FIG. 1b shows a 2×2 repeating pattern of pixels found on the CFA of an RGB-IR sensor.
Figure 1C:
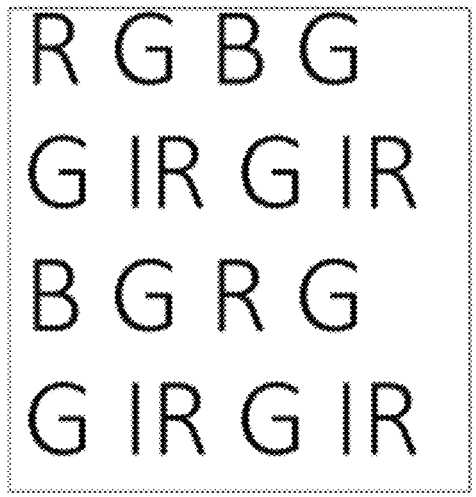
FIG. 1c shows a 4×4 repeating pattern of pixels found on the CFA of an RGB-IR sensor.
Figure 1D:
FIG. 1d shows a 2×2 repeating pattern of pixels found on the CFA of an RGBW sensor.
Figure 2:
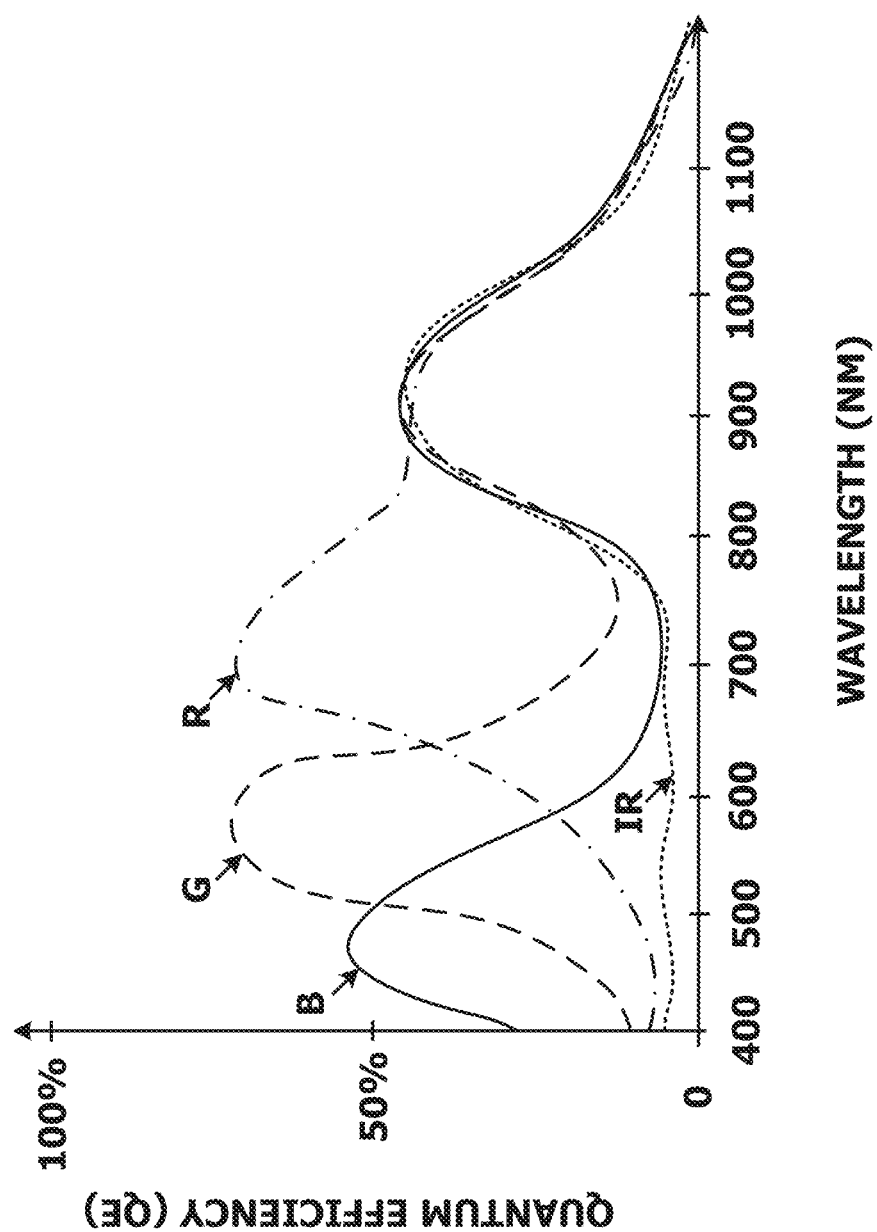
FIG. 2 shows a graph plotting the quantum efficiency of the [R G B IR] pixels of a typical RGB-IR sensor against the wavelength of the incoming light in nanometres (with no optical filter used).
Figure 3:
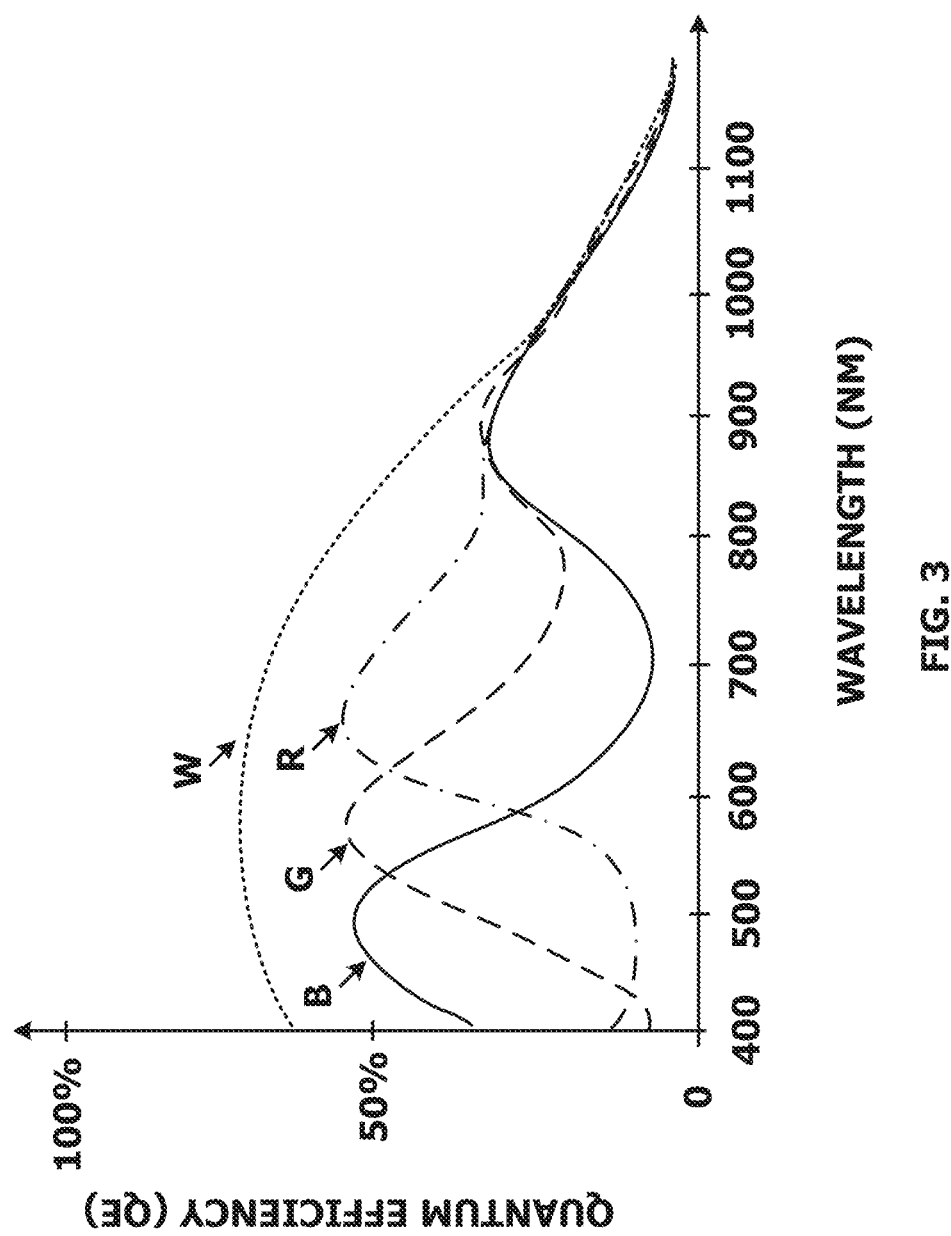
FIG. 3 shows a graph plotting the quantum efficiency of the [R G B W] pixels of a typical RGBW sensor against the wavelength of the incoming light in nanometres (with no optical filter used).

The first information used for generating input and output LUT samples is the set of QE curves for the multispectral sensor. These may be obtained from the manufacturer, measured from a sensor sample or otherwise derived. FIGS. 2 and 3 show examples of these curves for typical RGB-IR and RGBW sensors. These curves show the relative sensitivity of each type of pixel on the sensor for each wavelength of incident light.

Figure 4:
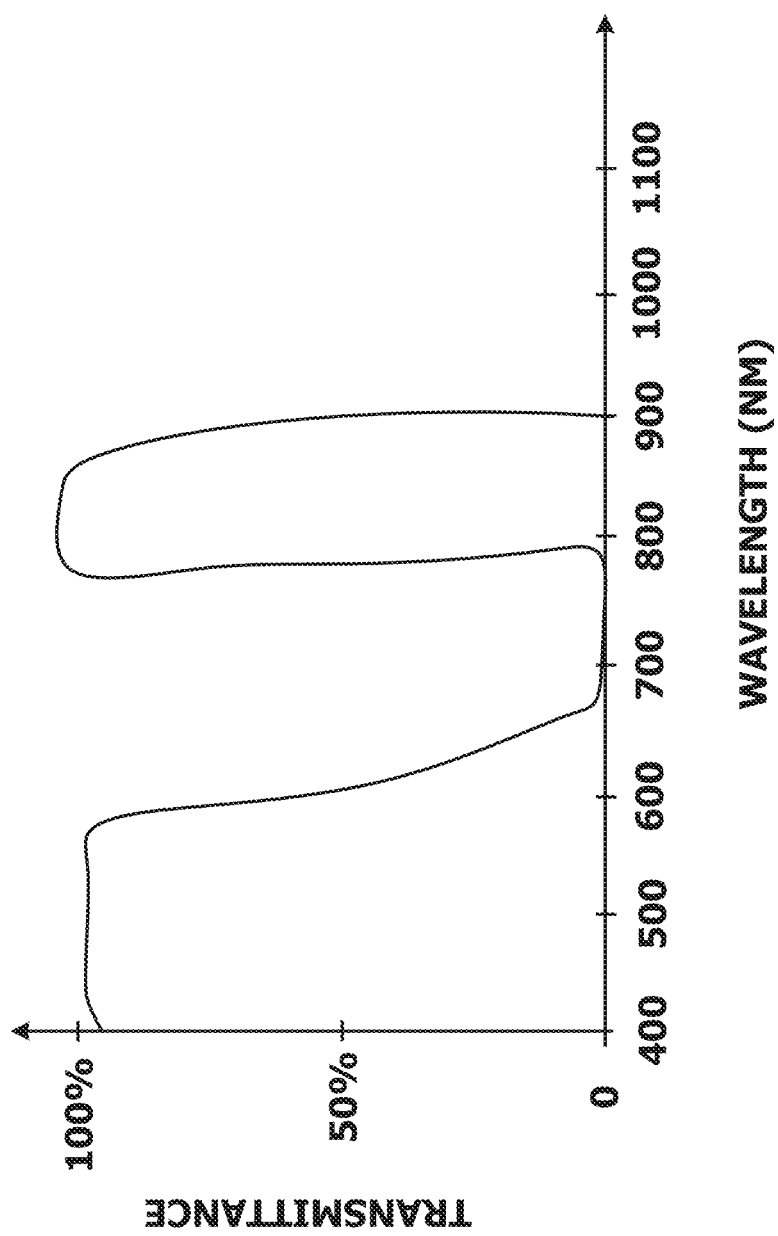
FIG. 4 shows a graph plotting the transmittance of a typical 850 nm-centred dual band-pass (notch) filter against the wavelength of incoming light in nanometres.
Figure 5:
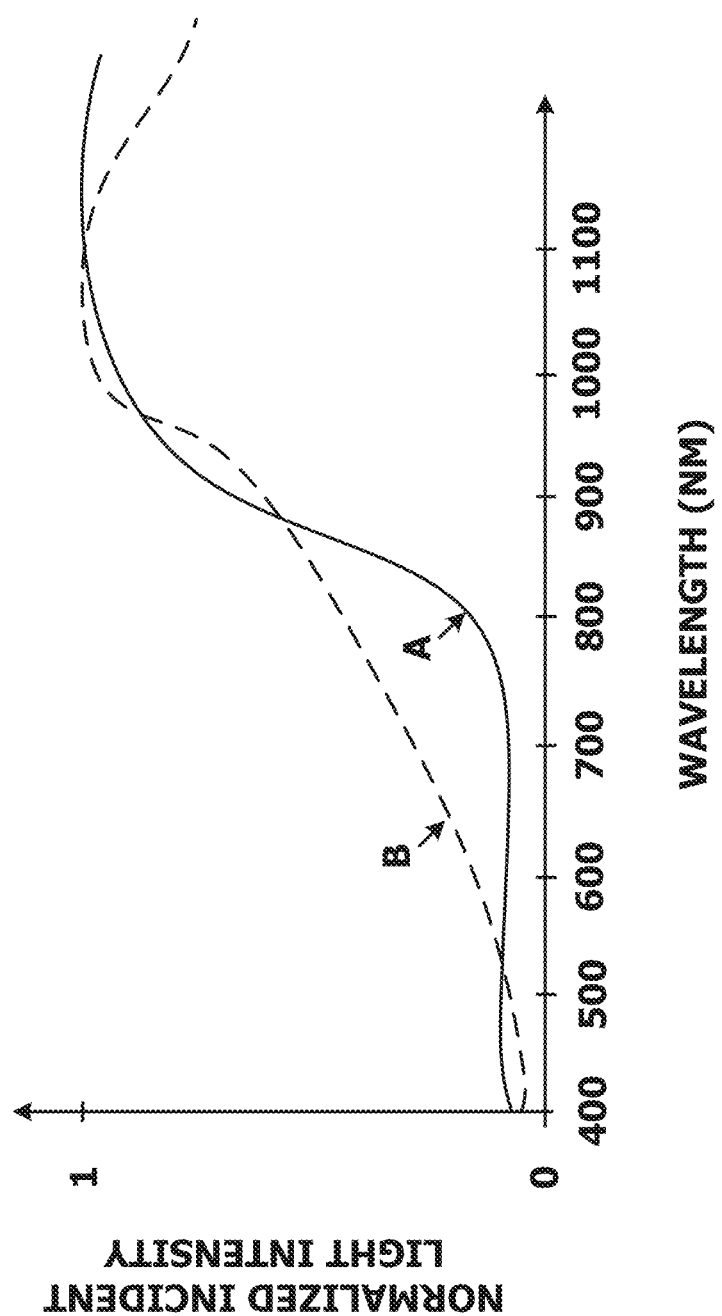
FIG. 5 shows a graph plotting the normalized incident light intensity spectra of A) an example of a highly IR reflective material illuminated by an illuminant with equal power for all wavelengths and B) a tungsten illuminant reflected from a surface with equal reflectance for all wavelengths.

If a dual band-pass filter (as is used in some RGB-IR imaging systems) or other optical filter is used in front of the sensor, the transmittance spectrum of this filter must also be known. An example of this transmittance spectrum for a visible-infrared dual-band pass filter centred around 850 nm is shown in FIG. 4. The QE curve for the multispectral sensor is then pointwise-multiplied with this transmittance spectrum (normalized to between 0 and 1) to obtain the sensitivity of the complete imaging system at each wavelength for each type of pixel.

Next, a set of incident light spectra may be generated. Each of these spectra represents a spectrum of light hitting the sensor and is (in the case of real scenes) the spectrum of the illuminant at a certain point in space pointwise-multiplied by the reflectance of the surface at that point, which spectra may also be affected by atmospheric attenuation or scattering. For the purpose of this embodiment, these spectra have no physical meaning, and are only inputs to the calculations.

In one embodiment of this disclosure, the conjugate gradient method of numerical optimisation is used to generate spectra which, when pointwise-multiplied by the QE curves of the multispectral imaging system, will produce an even sampling in the N-D RGB+multispectral space.

To do this, first, a set of target N-D outputs are created. These are the responses that the multispectral imaging system should output when the input spectra are multiplied by the QE curves of the sensor. In the case of RGB-IR imaging, this could be done as in the following pseudocode (assuming we are working with floating point values in the range between 0 and 1, and 1000 sample divisions per dimension):

```
number_sampling_per_dimension=1000;
for (r = 0; r < number_sampling_per_dimension; r++){
    for (g = 0; g < number_sampling_per_dimension; g++) {
        for (b = 0; b < number_sampling_per_dimension; b++) {
            for (i = 0; i < number_sampling_per_dimension; i++) {
                this_red = (r)/(number_sampling_per_dimension-1);
                this_green = (g)/(number_sampling_per_dimension-1);
                this_blue = (b)/(number_sampling_per_dimension-1);
                this_ir = (i)/(number_sampling_per_dimension-1);
                target_samples[r][g][b][i]
                    ={this_red,this_green,this_blue,this_ir};
            }
        }
    }
}
```

Then, for each target sample, a large set (e.g., 1000) random spectra are generated, consisting of wavelength intensity values (e.g., normalize values ranging between 0 and 1) spaced at intervals along the wavelength spectrum (e.g., at 10 nm intervals from 300 nm to 1100 nm, making 81 spectrum values). In one embodiment, the set is a data set representing hypothetical spectra that is generated by a computer system. Initial errors are calculated by point-wise multiplying the random spectra with the RGB-IR QE curves, and finding the absolute difference between the resulting RGB-IR quadruplets and the target sample values.

Assuming 81 spectrum points are being used for an RGB-IR imaging system, then the conjugate gradient method may be used to minimize the following function (up to a specified maximum number of iterations), where Q is 4×81 set of QE sensitivity values, S is the 81×1 candidate spectrum vector and I is the target 4×1 RGB-IR sample vector:

$$\arg \min(S) |QS-I|_1 \quad \text{(Eqn. 1)}$$

If any of the numerically-refined spectra produce RGB-IR quadruplets sufficiently close to the required target sample when multiplied by the QE curves, then those spectra are added to the training set of a trainable model. This is repeated until sufficient spectra for each target sample are generated.

This method of generating spectra is not real-time, but, as it is only necessary to generate them once per imaging sensor type, this is not an important issue. Other mathematical minimization or optimization methods may be used instead of the conjugate gradient method, such as quadratic programming, genetic algorithms, and other nonlinear optimization techniques.

Figure 6:
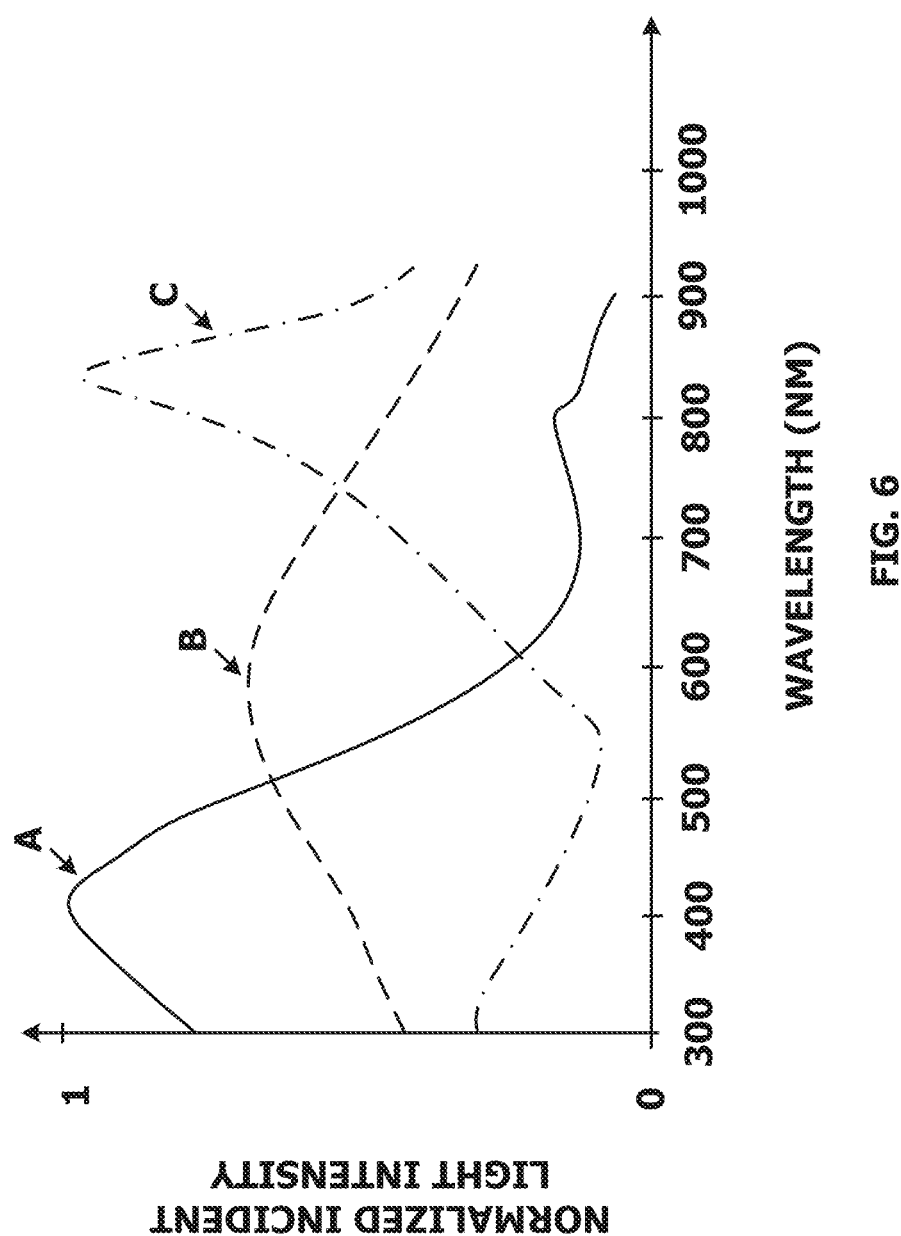
FIG. 6 shows three examples (labelled A-C) of synthetic incident light spectra used in LUT calculation.

Turning back now to FIG. 6, three examples of these spectra, generated for an RGB-IR imaging system, are shown. Other embodiments of the disclosure could use other methods of generating the spectra, such as randomly-varying spectra or polynomial functions with random or evenly-sampled coefficients.

Once the full set of spectra has been generated, they may be pointwise-multiplied by the QE curves of the multispectral imaging system to produce input N-D samples. To produce the visible RGB output samples, the spectra are pointwise-multiplied by the RGB QE curves of the multispectral imaging system, but only between 400-700 nm (i.e., approximately the visible spectrum of the human eye). This approximates the response of a visible RGB imaging system.

As an alternative to the preferred embodiment, which uses QE curves and simulated spectra to calculate input and output samples, a large number of images may be captured from the multispectral imaging system, e.g., of a scene composed of calibrated targets with controlled illumination conditions. This would provide the input multispectral sample data. An optical band-pass filter which blocks all wavelengths outside the visible spectrum may be placed in front of the imaging system to provide the corresponding output visible spectrum RGB samples, or a separate visible spectrum imaging system with aligned field of view may be used as the RGB reference. Of course, synthetic spectra generation can be performed more quickly and generally in a simpler fashion than controlled illumination.

Calculation of the Decorrelation LUT from Input/Output Samples

One embodiment of the present disclosure uses Gaussian process regression (GPR), further details of which can be found in Rasmussen, C. E. and C. K. I. Williams. Gaussian Processes for Machine Learning. MIT Press. Cambridge, Mass., 2006, the content of which is hereby incorporated by reference. This is used to calculate a model representing the decorrelation of the multispectral image data from the input N-dimensional and output RGB samples generated using the set of spectra S and the QE curves of the multispectral imaging system.

Other embodiments of the present disclosure may use other mathematical techniques to go from input and output samples to LUT data, such as direct numerical optimization, lattice regression (see, e.g., Garda, Eric, and Maya Gupta. "Lattice regression." *Advances in Neural Information Processing Systems*. 2009, the content of which is hereby incorporated by reference), radial basis functions (see, e.g., Poljicak, Ante, Jurica Dolic, and Jesenka Pibernik. "An optimized Radial Basis Function model for color characterization of a mobile device display." *Displays* 41 (2016): 61-68, the content of which is hereby incorporated by reference), or genetic algorithms.

In another embodiment disclosed herein, mathematical techniques may be used to go from input and output samples where the LUT is broken into two parts. One LUT best maps input values to best approximate output hue and saturation. The second LUT best maps input values to the output brightness. Splitting the mapping in this way achieves exposure invariance because, as the input intensity (i.e., vector magnitude) changes, the output hue and saturation remains unchanged (which also mirrors the physics of the real world). The pair of LUTs can be found using any of the aforementioned regression techniques.

One embodiment fits a separate Gaussian process regression model for each of the RGB outputs (e.g., one model for each of R, G and B, or a combined model could also be used). For example, in MATLAB, this could be accomplished in the following way (where "ndim_inputs" represents the M×N matrix of N-D input samples, and "rgb" is the M×3 matrix of output RGB samples):
for i=1:3
    gprMdl{i}=fitrgp(ndim_inputs,rgb(:,i));
end Depending on the number of input and output sample pairs used, this regression may take a long time—the regression is $O(n^3)$ in complexity—but this regression is only calculated once per imaging system.

Once the model has been calculated, the N-D input space is sampled (either uniformly or non-uniformly, depending on the type of LUT desired, e.g., the sampling is uniform in this embodiment) and these samples are given as inputs to the GPR model. The outputs of the model are used as the data corresponding to the nodes in the N-D decorrelation LUT.

Using the Decorrelation LUT to Decorrelate Multispectral Image Data

After obtaining the LUT node data values from the GPR model, this data (and, if necessary, the node locations within the input image space, e.g., if the spacing is non-uniform) are stored in the memory of the imaging system.

When an input image is captured by the multispectral imaging system, it is arranged as the RAW responses of the sensor, e.g., arranged in a pattern such one of those in FIGS. 1a-1d. This pattern of responses is first passed into a demosaicking algorithm (which must be tailored to the specific multispectral CFA pattern) to produce full-resolution image channels in RGB and multispectral bands. Other pre-processing may also take place, such as defective pixel correction and/or noise reduction.

Next, the N-dimensional input image data for each pixel is used as input data for the decorrelation LUT. The upper bits of the input data are used to select the node data that is required to interpolate between. The lower bits are used as a weight with which to alpha blend the data from the two nearest nodes. This embodiment performs N-dimensional interpolation as a series of 1-D linear interpolations, each one reducing the number of dimensions by 1, until we reach 0 dimensions (3 output RGB values). Other types of interpolation such as doing the N-dimensional linear interpolation in step, or quadratic or cubic-spline interpolation may also be used.

An example of the inputs and outputs of this procedure for the case of RGB-IR imaging is shown in FIGS. 8a-8b and 9a-9b. FIG. 8a shows the input captured RGB luma (in reality, this would be a 3-dimensional RGB image, but it is shown as luma here for ease of illustration), and FIG. 8b shows the input captured IR image. Note the high level of correlation between the RGB and IR images, because the RGB pixels are also sensitive to IR wavelengths of light. Together, the RGB and IR inputs act as 4-D inputs to the RGB-IR decorrelation LUT created for this imaging system.

After the Decorrelation LUT—Post-Processing

This section describes how embodiments of the disclosure fit into the rest of an imaging system.

The output visible RGB image produced by embodiments of the present disclosure (which has been decorrelated from the IR image) may be either passed into a standard ISP or written to storage.

White balance gains—either measured by a separate sensor or calculated from statistics of the decorrelated RGB image—may be applied to the decorrelated RGB image.

A standard 3×3 CCM (e.g., calibrated using standard techniques) may then be applied to the output visible RGB image, to transform the RGB colours produced by the sensor and decorrelation LUT into a standard colour space, such as linear sRGB.

An image fusion method may be used to re-add IR information into desired areas of the image. If a colour output is required, then colour information must be taken into account by the fusion algorithm.

Any other standard image processing steps may take place after this, such as RGB noise reduction, sharpening, dynamic range compression (DRC) and gamma correction.

It is to be appreciated that certain embodiments, as discussed below, may be incorporated as code (e.g., a software algorithm or program) residing in firmware and/or on a computer readable medium or computer program product having control logic for enabling execution on a computer system having a computer processor (or implemented as an FPGA, ASIC, or similar). Such a computer system typically includes memory storage configured to provide output from execution of the code, which configures a processor in accordance with the execution. The code can be arranged as firmware or software, and it can be organized as a set of modules such as discrete code modules, function calls, procedure calls or objects in an object-oriented programming environment. If implemented using modules, the code can comprise a single module or a plurality of modules that operate in cooperation with one another.

Optional embodiments can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments have been described, it should be understood that various changes, substitutions, and alterations can be made by one of ordinary skill in the art without departing from the inventive scope, which is defined by the recitations in the claims and equivalents thereof.

The following claims set out selected features of embodiments of the present invention, although it will be appreciated that the features and their groupings are not essential, and that the features and groupings may vary from embodiment to embodiment.

What is claimed is:

1. A method of creating a multispectral decorrelation model for use in determining a visible image from a multispectral image captured using a multispectral image sensor, the method comprising the steps of:

generating, using a plurality of quantum efficiency curves for the multispectral image sensor and a plurality of synthetic light spectrum vectors, a grid of synthetic multispectral pixel values and a corresponding grid of synthetic visible pixel values, wherein each synthetic visible pixel value is substantially decorrelated from a non-visible component of a corresponding synthetic multispectral pixel value; and determining a multispectral decorrelation model using the grid of synthetic multispectral pixel values and the corresponding grid of synthetic visible pixel values, wherein the multispectral decorrelation model, in use, maps a multispectral pixel value of the multispectral image to a visible pixel value of the visible image.

2. The method of claim 1, wherein the plurality of synthetic light spectrum vectors evenly sample multispectral image space when point-wise multiplied by the plurality of quantum efficiency curves.

3. The method of claim 1, wherein the multispectral decorrelation model consists of a trainable model such that a trained multispectral decorrelation model estimates a transformation from multispectral image space to visible image space.

4. The method of claim 3, wherein the multispectral decorrelation model is one of: a Gaussian process regression model; a lattice regression model; a neural network; a genetic algorithm.

5. The method of claim 3, wherein the multispectral decorrelation model is exposure invariant.

6. The method of claim 3, further comprising the steps of:
determining a plurality of input multispectral pixel values by evenly sampling multispectral image space; and
providing the plurality of input multispectral pixel values to the trained multispectral decorrelation model thereby to populate a decorrelation look-up-table.

7. The method of claim 6, further comprising the step of:
saving the decorrelation look-up-table to a computer-readable medium.

8. The method of claim 1, wherein the grid of synthetic multispectral pixel values is generated by point-wise multiplying the plurality of quantum efficiency curves by the plurality of synthetic light spectrum vectors.

9. The method of claim 1, wherein the grid of corresponding synthetic visible pixel values is generated by one of: point-wise multiplying the plurality of quantum efficiency curves by the plurality of synthetic light spectrum vectors in the range of 400-700 nm; and point-wise multiplying a plurality of visible light specific quantum efficiency curves by the plurality of synthetic light spectrum vectors.

10. The method of claim 1, wherein a synthetic light spectrum vector of the plurality of synthetic light spectrum vectors represents a spectrum of light incident on the multispectral image sensor.

11. The method of claim 1, further comprising the step of:
optimizing, using a numerical optimization algorithm, a loss function thereby to generate a synthetic light spectrum vector of the plurality of synthetic light spectrum vectors.

12. The method of claim 11, wherein the loss function calculates a difference between a candidate synthetic light spectrum vector multiplied by the plurality of quantum efficiency curves and a target multispectral pixel value.

13. The method of claim 11, wherein the numerical optimization algorithm is one of: a conjugate gradient method; and a quadratic programming algorithm.

14. The method of claim 1, further comprising the step of:
multiplying a transmission spectrum of an optical filter to each quantum efficiency curve of the plurality of quantum efficiency curves prior to the step of generating.

15. The method of claim 14, wherein the optical filter is a dual band-pass filter comprising an infrared transmission centered at 850 nm or 940 nm.

16. The method of claim 1, wherein a multispectral pixel value of the multispectral image comprises a red pixel value, a blue pixel value, a green pixel value, and an infrared pixel value.

17. The method of claim 1, wherein a multispectral pixel value of the multispectral image comprises a red pixel value, a blue pixel value, a green pixel value, and a white pixel value.

18. An apparatus comprising:
one or more processors; and
a computer-readable medium including one or more sequences of instructions that, when executed by the one or more processors, cause the apparatus to execute the method of claim 1.

19. The apparatus of claim 18, wherein the sequences of instructions further cause the apparatus to execute the method of claim 2.

20. A non-transitory computer-readable medium having stored thereon sequences of instructions to cause one or more processors to carry out the method of claim 1.

* * * * *